Dec. 23, 1958   G. M. REED   2,865,276
PEANUT HARVESTING SWEEP
Filed May 6, 1955   2 Sheets-Sheet 1
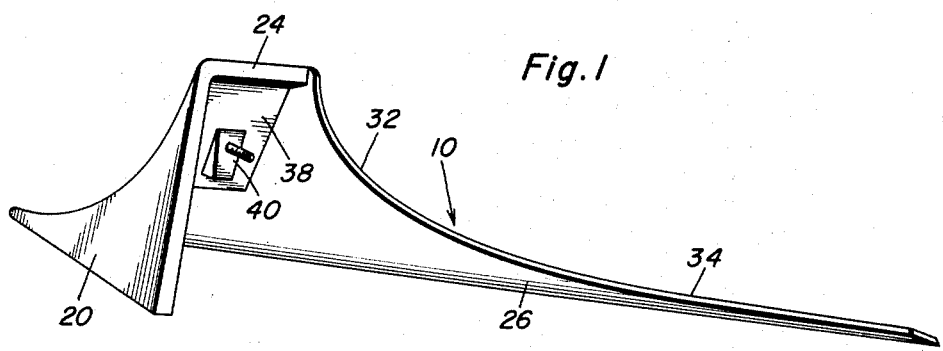
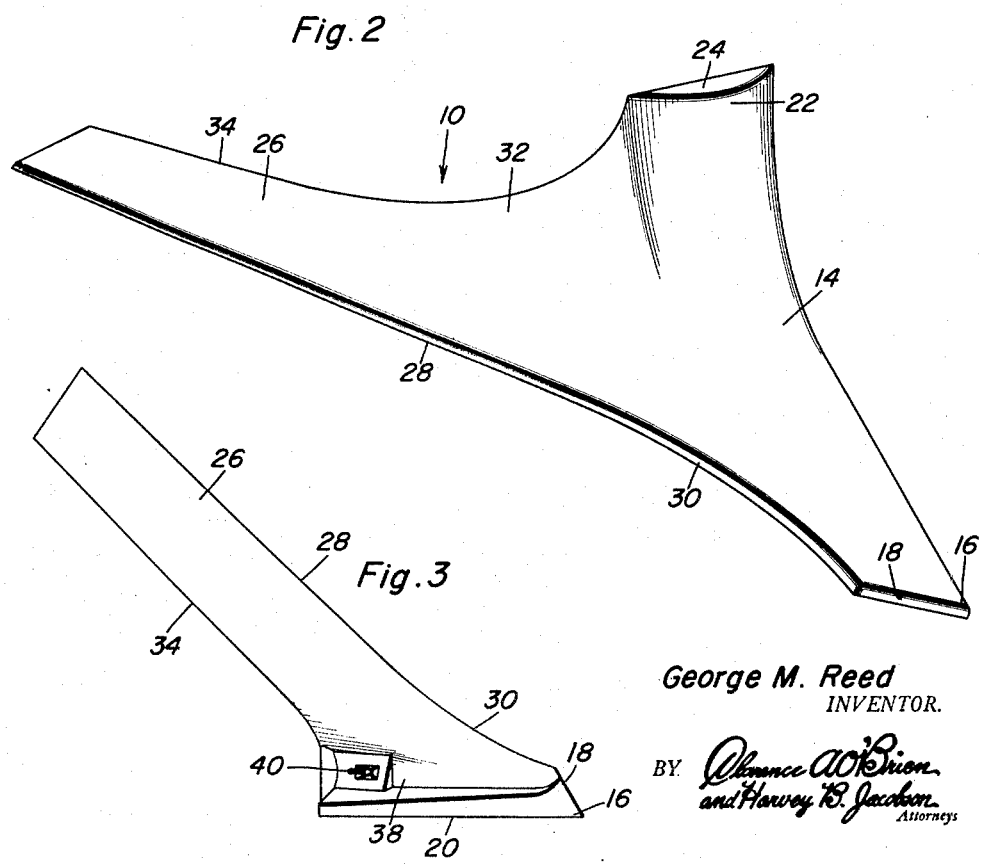
George M. Reed
INVENTOR.

Dec. 23, 1958 G. M. REED 2,865,276
PEANUT HARVESTING SWEEP
Filed May 6, 1955 2 Sheets-Sheet 2
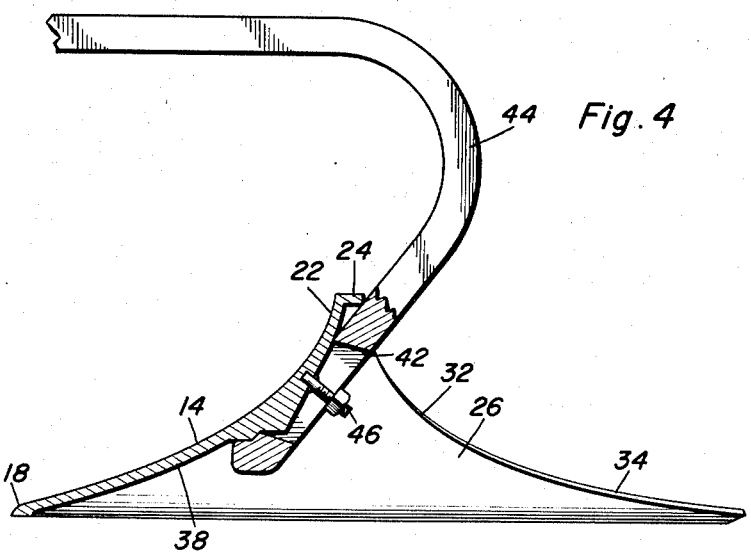
Fig. 4
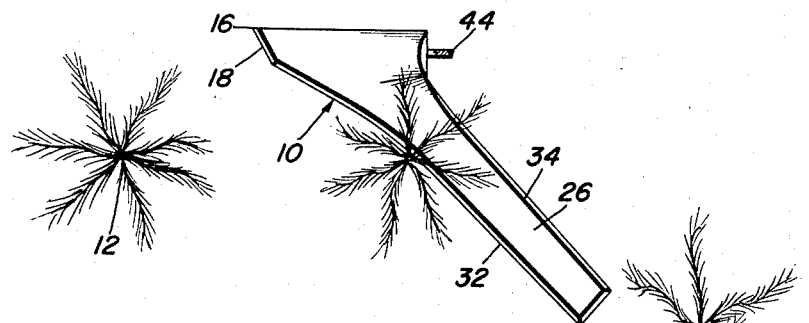
Fig. 5
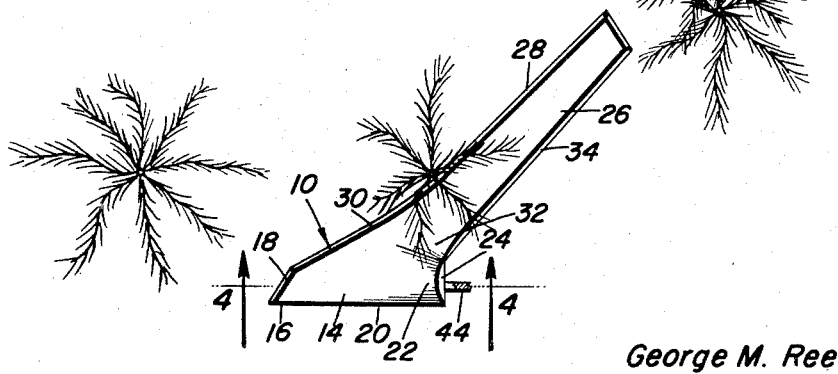
George M. Reed
INVENTOR.
BY *Clarence A. O'Brien*
*and Harvey B. Jacobson*
Attorneys

United States Patent Office 2,865,276
Patented Dec. 23, 1958

2,865,276

PEANUT HARVESTING SWEEP

George M. Reed, Jourdanton, Tex.

Application May 6, 1955, Serial No. 506,589

1 Claim. (Cl. 172—720)

This invention generally relates to peanut harvesting devices and more specifically provides improved and novel construction of a pair of sweeps for simultaneously digging a pair of rows of peanuts and depositing the loosened vines and nuts attached thereto in substantially a single row for subsequent removal.

For many years, peanuts have been harvested by the use of some type of conventional plow to rout the peanut plants and the peanuts attached thereto from the soil after which they are gathered by hand or by one of the several types of peanut rakes used for this purpose. These rakes generally are the same type of rakes utilized in harvesting hay and the conventional plows now used will cause approximately five to twenty percent of the peanuts to be displaced from the peanut vines or plants thereby leaving the displaced nuts in the soil as a total loss. Accordingly, it is the primary object of the present invention to provide an improved and novel pair of peanut sweeps for mounting in facing relation to each other wherein each of the sweeps includes an elongated inwardly and rearwardly extending wing together with a land side and pilot point.

Another object of the present invention is to provide peanut sweeps in accordance with the preceding object wherein the swept back wing and the specific construction of the pilot point and the main body portion of the sweeps will cause a spiralling or corkscrew movement of the soil adjacent the peanut vines after which the leading edge of the wing contacts the tap root of the peanut vine and as the wing passes under the tap root, the clump of peanuts is gently lifted along with the line and the whole mass is set down about 8 inches inwardly from the row from which it was originally removed thereby thoroughly loosening the vines and nuts attached thereto without jarring loose any nuts or without tossing dirt onto the vine.

Another important feature of the present invention is to provide peanut harvesting sweeps in accordance with the preceding objects in which the land side is so arranged to counteract lateral forces induced by the laterally extending swept back wings thereby providing a stable and easily controlled peanut sweep for accurately positioning on the outer edge of two spaced rows of peanut vines for harvesting the same.

Other important objects of the present invention will reside in its simplicity of construction, accurateness, ease and rigidity of attachment to the usual plow beams, its efficiency for its particular purpose and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear perspective of one of the pair of peanut harvesting sweeps of the present invention illustrating the centering lug and the shape of the swept-back wing and the position of the land side;

Figure 2 is a front perspective view of the sweep of Figure 1 illustrating the construction of the pilot point together with the construction of the swept-back wing and the smooth curve connecting the wing to the main body portion thereof;

Figure 3 is a bottom plan view illustrating further structural relationships of the sweep of Figure 1;

Figure 4 is a longitudinal sectional view taken substantially upon the plane passing along section line 4—4 of Figure 5 showing the mounting means for the sweep on the lower end of the plow beam; and Figure 5 is a diagrammatic plan view illustrating the position of the pair of peanut sweeps as they are utilized for harvesting two rows of peanuts simultaneously.

While the subsequent description of the invention defines and the drawings specifically illustrate a pair of sweeps mounted in facing relation to each other, it will be understood that it is within the purview of the present invention to mount only a single sweep for movement along a single row of peanut plants or vines wherein the designation of peanut plants or vines includes the foliage above the ground, the stalk or stem and the root system and the peanuts below the ground wherein the root system is severed just below the peanuts after the plant is raised slightly out of the soil. The term "harvesting" employed in the specification specifically designates the routing or lifting of the peanuts together with the plants out of the ground or soil for subsequent collection by any suitable means.

Referring now specifically to the drawings, it will be seen that the numeral 10 generally designates peanut harvesting sweeps of the present invention which are adapted to be used in pairs as illustrated in Figure 5 wherein the peanut sweeps are disposed in opposing relation for harvesting two rows of peanuts having vines with tap roots 12 extending downwardly therefrom whereby the harvesting sweeps will lift up the peanut vines and deposit the same substantially in a single row as illustrated in Figure 5.

Each of the peanut harvesting sweeps 10 includes a central body portion 14 terminating at its lower end in a pilot point 16 having an angulated substantially horizontal edge 18 extending therefrom and a generally vertical wall 20 extending rearwardly therefrom which forms substantially a land side for the sweep 10. The body portion 14 curves upwardly and rearwardly from the point 16 to a generally convex surface 22 at the upper end 24 thereof.

Projecting laterally from the main body portion 14 is an elongated swept back wing member 26 which generally extends horizontally inwardly and is provided with a leading edge 28 that is connected to the angulated end 18 of the body 14 by a smooth concave curve 30. The upper surface of the wing member 26 is connected to the main body portion 14 with an upwardly curved portion 32 which forms a smooth curve from the top 24 of the main body portion 14 down to the central portion of the body 14 whereby soil riding on the upper surface of the body 14 and the adjacent portion of a wing 26 will be urged in a corkscrew manner or in a spiral manner. The wing member 26 is also provided with a trailing edge 34 which is normally disposed above the leading edge 28 wherein the soil and vine passing over the wing 26 will be lifted upwardly. Therefore, it will be seen that soil and vines engaging the upper surface of the main body 14 and the adjacent curved portion 32 will tend to spiral or corkscrew and the curved portion 30 of the leading edge 28 will contact the tap root 12 of the peanut thereby lifting the tap root, the soil adjacent thereto and the peanut attached thereto and simultaneously move the vines upwardly and towards the end of the wing member 26 for discharge from the end thereof. This simultaneous lifting moving and spiralling will effectively remove the dirt from the roots without jarring the peanuts therefrom.

On the rear of the body member 14, the space between the land side 20 and the curved portion 32 is hollow and generally curved as designated by the numeral 38. Projecting therefrom is a centering lug 40 for reception in a slot 42 in the lower end of a curved supporting beam 44. This supporting beam 44 may be of any conventional construction normally employed in conjunction with tractors or supporting the sweeps 10 in the desired manner. A suitable fastening bolt 46 may be employed for securing the sweeps 10 to the beam 44 and the tapered lug 40 will engage the slot 42 in the beam 44 for securely and rigidly securing the sweep 10 thereto in a self-centering manner.

In the harvesting operation utilizing the sweeps of the present invention, the pilot point 16 is set to run approximately 8 to 10 inches to one side of the center of the row of tap roots 12 of the peanut vines. The pilot point also is set to run approximately one to two inches below the level of the clump of peanuts on the vines. As a result of this setting and forward movement of the sweeps 10, the pilot point will start lifting the dirt and start a corkscrew movement of the soil backward before the swept back wing 26 contacts the tap root 12 of the peanut vine. As the wing 26 passes under the tap root and the clump of peanuts, it gently lifts the nuts and vines upwardly and sets the entire mass back down approximately 8 inches inwardly from where the vine originally grew. In doing this, no dirt is tossed onto the vine or the peanuts and no nuts are jarred loose from the vine.

The sweeps 10 are of integral one-piece construction and the curve of the wing member 26 starting at the top of the main body portion or shank 14 lends rigidity to the wing for preventing bending of the wing under heavy stresses in hard soils. This curve also sets up the corkscrew movement to the first portion of the soil that is moving before the wing contacts the tap roots and the nuts. This corkscrew movement of the soil loosens the soil around the nuts and as soon as the leading edge 28 of the wing reaches the tap root and the clump of nuts, this action entirely ceases since the curve substantially straightens out and there is substantially a flat surface on the wing 26. Also, it is to be pointed out that the land side 20 of the sweeps 10 does not stand truly vertical but is disposed in a slight angular relation which will tend to cause the sweep to bite into the soil at the bottom of the sweep 10 due to the particular angulation of the end 18 adjacent the pilot point 16. This angulated arrangement offsets the tendency of side draft or lateral movement of the sweeps on account of forces exerted on the elongated swept back wing members 26 thereby forming an accurately controlled and relatively easily maneuvered peanut harvesting sweeps which will eliminate the loss due to peanuts being knocked from the peanut vine during the harvesting operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A device for routing peanut plants with the peanuts thereon from the soil, said device comprising a one-piece sweep having an upstanding hollow body portion, a vertical land side forming one side of the body portion and terminating in a concave upper and forward edge, said body portion terminating at its forward end in a lower edge in acute angular relation to the front lower corner of the land side thereby forming a point for insertion into the soil, the region of the body portion disposed rearwardly of the front lower edge being inclined upwardly and slightly rearwardly from the line of juncture with the land side, the upper region of the body portion having a transversely convex front surface smoothly merging into the inclined region whereby soil moving over the point and body portion will be turned in a spiral manner away from the land side, a relatively thin wing extending laterally from said body portion, said wing being elongated and having the major portion thereof extending rearwardly of the body portion and land side, the leading edge of said wing including a slightly concave inner portion extending from the rear corner of the front lower edge of the body portion, the outer portion of the leading edge of the wing being substantially parallel to the outer portion of the trailing edge of the wing, the inner portion of the trailing edge of the wing curving upwardly to the upper edge of the body portion, the upper surface of the inner portion of the wing curving upwardly for merging with the inclined region of the body portion, the upward slope of the upwardly curved surface of the wing being greatest adjacent the upper edge of body portion, the trailing edge of the wing being above the leading edge throughout the length thereof whereby the upper surface of the sweep will lift peanut plants with the peanuts thereon and move the same laterally in a spiral manner for separating dirt from the peanuts and depositing the plants and peanuts in a row substantially on top of the soil, the inner portion of the wing forming the other side of the body portion for receiving a supporting beam against the rear of the body portion.

References Cited in the file of this patent

UNITED STATES PATENTS

| 197,638 | Johnson | Nov. 27, 1877 |
| 274,670 | Stone | Mar. 27, 1883 |
| 382,522 | Goode | May 8, 1888 |
| 429,037 | Kern | May 27, 1890 |
| 870,127 | Posey | Nov. 5, 1907 |
| 1,011,128 | Leatherwood | Dec. 5, 1911 |
| 1,285,276 | McArdle | Nov. 19, 1918 |
| 1,499,531 | Hoeregott | July 1, 1924 |
| 2,320,024 | Anderson | May 25, 1943 |
| 2,586,255 | Pleskac | Feb. 19, 1952 |
| 2,614,376 | Madsen | Oct. 21, 1952 |